United States Patent
Makino et al.

(10) Patent No.: US 10,361,543 B2
(45) Date of Patent: Jul. 23, 2019

(54) METHOD FOR MANUFACTURING WIRE HARNESS

(71) Applicant: YAZAKI CORPORATION, Tokyo (JP)

(72) Inventors: Kimitoshi Makino, Shizuoka (JP); Tetsuro Saimoto, Shizuoka (JP); Akihito Shibuya, Shizuoka (JP); Masataka Yamamoto, Shizuoka (JP); Kenji Kinezuka, Shizuoka (JP); Shinnya Matsuura, Shizuoka (JP); Yasuhiro Suzuki, Shizuoka (JP); Takafumi Mori, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 16 days.

(21) Appl. No.: 15/098,095

(22) Filed: Apr. 13, 2016

(65) Prior Publication Data
US 2016/0307670 A1 Oct. 20, 2016

(30) Foreign Application Priority Data

Apr. 15, 2015 (JP) ................... 2015-083633
Mar. 18, 2016 (JP) ................... 2016-054986

(51) Int. Cl.
*B29C 45/14* (2006.01)
*H02G 3/04* (2006.01)
*H02G 3/22* (2006.01)

(52) U.S. Cl.
CPC .......... *H02G 3/0406* (2013.01); *B29C 45/14* (2013.01); *B29C 45/14467* (2013.01); *H02G 3/22* (2013.01)

(58) Field of Classification Search
None
See application file for complete search history.

(56) References Cited

U.S. PATENT DOCUMENTS 2,716,623 A * 8/1955 Tator .................. H02G 1/145
174/84 R
2,892,013 A * 6/1959 Gomberg .......... B29C 45/14385
174/153 G (Continued)

FOREIGN PATENT DOCUMENTS

CN 102457039 A 5/2012
CN 102842807 A 12/2012

(Continued)

OTHER PUBLICATIONS

Japanese Office Action for the related Japanese Patent Application No. 2016-054986 dated Feb. 27, 2018.

(Continued)

*Primary Examiner* — Edmund H Lee
(74) *Attorney, Agent, or Firm* — Kenealy Vaidya LLP

(57) ABSTRACT

A water blocking structure of a wire harness and a method for manufacturing the wire harness is provided. The water blocking structure includes a set of wires including a plurality of wires arranged in at least one row and side by side in a direction of a diameter of the wire, and an integrally molded stopper made of a hard resin that is injection-molded at a low-pressure so as to surround a portion of the set of wires in an extending direction of the wires and to have an outer circumferential shape defining portion that conforms to an inner circumferential shape of a wire passage portion into which the set of wires is to be inserted.

3 Claims, 13 Drawing Sheets

(56) References Cited

U.S. PATENT DOCUMENTS

2002/0144839 A1 10/2002 Noro et al.
2006/0240710 A1 10/2006 Kato et al.
2012/0329337 A1 12/2012 Kataoka et al.

FOREIGN PATENT DOCUMENTS

| | | |
|---|---|---|
| CN | 203932468 U | 11/2014 |
| CN | 104218405 A | 12/2014 |
| CN | 204243329 U | 4/2015 |
| JP | 5-91126 U | 12/1993 |
| JP | 2002-315159 A | 10/2002 |
| JP | 2003-151368 A | 5/2003 |
| JP | 2006-302850 A | 11/2006 |
| JP | 2006-352944 A | 12/2006 |
| JP | 2011-172412 A | 9/2011 |
| WO | 2010/095334 A1 | 8/2010 |

OTHER PUBLICATIONS

Chinese Office Action for the related Chinese Patent Application No. 201610236606.4 dated Jan. 19, 2018.

\* cited by examiner

FIG. 15A
FIG. 15B
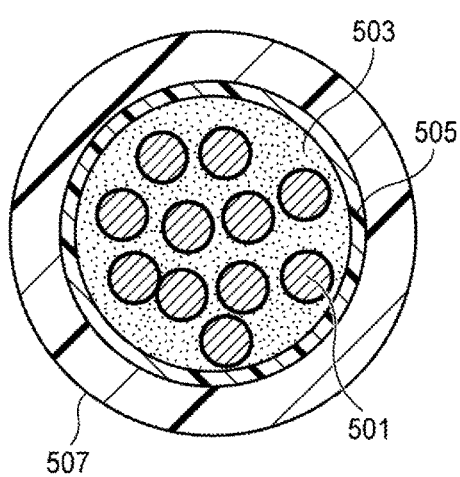
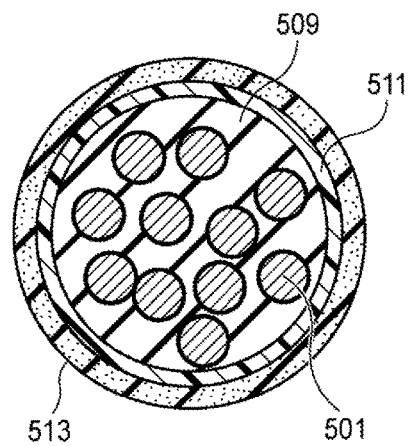

METHOD FOR MANUFACTURING WIRE HARNESS

CROSS-REFERENCE TO RELATED APPLICATIONS

The present application claims priority from Japanese Patent Application No. 2015-083633 filed on Apr. 15, 2015 and Japanese Patent Application No. 2016-054986 filed on Mar. 18, 2016, the entire contents of which are incorporated herein by reference.

FIELD OF INVENTION

The present invention relates to a water blocking structure of a wire harness and a method for manufacturing the wire harness.

RELATED ART

Water blocking structures of a wire harness having a bundle of wires are known that are of a single-liquid (silicone) type structure and a structure using butyl rubber. As shown, in FIG. 15A, a single-component type water blocking structure is produced by separating a bundle of wires into individual wires 501, applying silicon 503 to them, adapting it to the wires 501, and molding and solidifying the silicon 503. The outer circumferential surface of the solidified silicon 503 is covered with a sheet member 505. A resulting wire harness that has been given the water blocking structure in this manner and has the sheet member 505 as the outermost member is inserted in a grommet 507. The grommet 507 serves for water proofing between the sheet member 505 and a harness insertion hole (not shown) of a vehicle body panel, for example.

As shown in FIG. 15B, a water blocking structure using butyl rubber is produced by separating a bundle of wires into individual wires 501, placing wires 501 on butyl rubber 509, placing butyl rubber 509 and a set of wires 501 on each other repeatedly, filling the spaces around the wires 501 with butyl rubber 509 by applying pressure to them, and molding the butyl rubber 509. An adhesive tape 511 is wound on the outer circumferential surface of the butyl rubber 509. A sealing sponge 513 is wound on a resulting wire harness that has been given the water blocking structure in this manner and has the adhesive tape 511 as the outermost member. The sealing sponge 513 serves for water proofing between the adhesive tape 511 and a harness insertion hole (not shown).

However, in the above single-component type water blocking structure, the spaces between the wires are filled with the water-stop agent (silicone 503) which is bonded to the coatings of the wires. Therefore, whereas this water blocking structure is much superior in waterproof performance, it has problems that the water-stop agent is difficult to manage and it is low in working efficiency because the solidification takes about several hours. On the other hand, the water blocking structure using butyl rubber 509 is superior in waterproof performance as long as butyl rubber 509 is charged surely because butyl rubber 509 itself is soft and is easily adapted to wires but is still adherent. However, this water blocking structure has a problem that it is difficult to manage the amount of butyl rubber 509 used. And the water blocking structure using butyl rubber 509 has other problems that work using the butyl rubber 509 is low in efficiency (e.g., it is sticky and easily sticks to hands) and does not allow a worker to check its charging state easily.

Among techniques that can be applied to water blocking structures is one that a resin material is applied to the outer circumferential surface of a bundle of wires and molded to form a mold structure (see, e.g., JP2011-172412A). However, in this mold structure, if three of more wires are bundled together, resin-uncharged interstices are formed between the wires adjacent to each other. Furthermore, this type of mold structure is formed using an ordinary injection molding machine, which requires a large facility. Still further, where an injection molding machine is used, it is necessary to prevent burrs from being formed due to leakage of molten resin when molten resin is injected into the cavity of a molding die. To this end, the molding die is provided with burr-cutting portions. The burr-cutting portions should be brought into close contact with the outer circumferential surfaces of wires when they are drawn out of the molding die, and hence have a plurality of projections whose tips are sharp like a mountain chain. As a result, scratches may develop in the coatings of the wires when a set of wires is set in place in the molding die. Careful handing is thus necessary, which lowers the working efficiency.

SUMMARY

Illustrative aspects of the present invention provide a water blocking structure of a wire harness and a method for manufacturing the wire harness, capable of easily restricting water from entering from a wire passage portion.

According to an illustrative aspect of the present invention, a water blocking structure of a wire harness is provided. The water blocking structure includes a set of wires including a plurality of wires arranged in at least one row and side by side in a direction of a diameter of the wire, and an integrally molded stopper made of a hard resin that is injection-molded at a low pressure so as to surround a portion of the set of wires in an extending direction of the wires and to have an outer circumferential shape defining portion that conforms to an inner circumferential shape of a wire passage portion into which the set of wires is to be inserted.

According to another illustrative aspect of the present invention, a method for manufacturing a wire harness is provided. The wire harness includes a set of wires including a plurality of wires arranged in at least one row and side by side in a direction of a diameter of the wire, and a stopper made of a hard resin, the stopper surrounding a portion of the set of wires in an extending direction of the wires and has an outer circumferential shape defining portion that conforms to an inner circumferential shape of a wire passage portion into which the set of wires is to be inserted. The method includes closing an upper die and a lower die in a state in which a portion of the set of wires is placed in harness receiving portions of the upper die and the lower die and injecting the hard resin in a molten state into the cavities of the upper die and the lower die at a low pressure. Each of the upper die and the lower die has a parting surface at which the harness receiving portion is formed. Each of the harness receiving portions has the cavity for molding of the stopper and flat burr-cutting portions for placing an outer circumference of the set of wires between the upper die and the lower die. The burr-cutting portions are provided at outer end portions of the cavity on both sides in the extending direction of the set of wires.

Other aspects and advantages of the invention will be apparent from the following description, the drawings and the claims.

BRIEF DESCRIPTION OF THE DRAWINGS

FIG. 12B is a front view of the of FIG. 12A;

FIG. 15A is a cross sectional view of a related art single-component type water blocking structure; and FIG. 15B is a cross sectional view of another related art water blocking structure using that uses butyl rubber.

DETAILED DESCRIPTION

Hereinafter, exemplary embodiments of the present invention will be described in detail with reference to the drawings. However, the following exemplary embodiments do not limit the scope of the claimed invention.

Figure 1A:
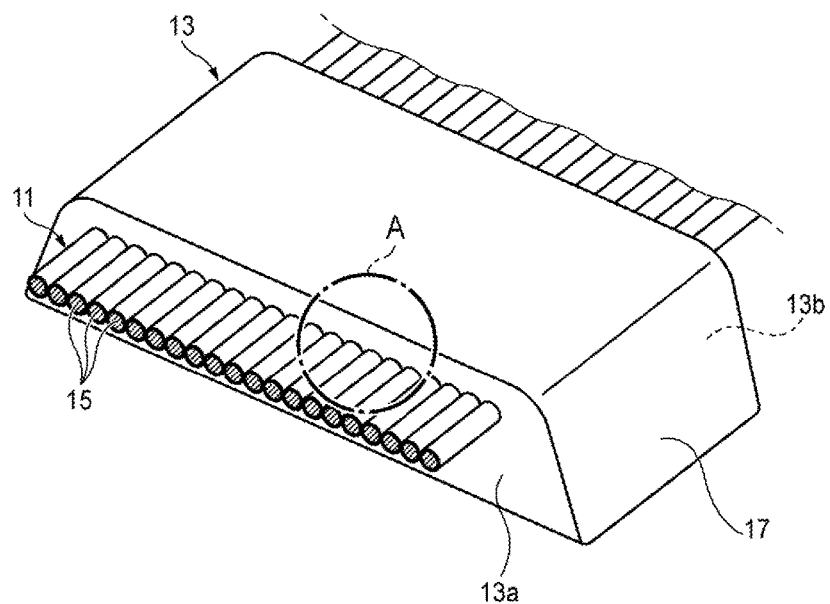
FIG. 1A is a perspective view of a water blocking structure according to an exemplary embodiment of the present invention, in which a stopper is provided for a set of wires arranged in a row.

As shown in FIG. 1A, a water blocking structure of a wire harness according to an exemplary embodiment of the present invention has a set of wires 11 and a stopper 13 made of a hard resin. The set of wires 11 consists of a plurality of wires 15 arranged in a horizontal direction.

The set of wires 11 is provided such that the wires 15 are arranged in a row side by side in a direction along a diameter of the wires 15. The outer circumferential surface of conductor of each wire 15 is covered with an insulating resin. The set of wires 11 is formed such that the wires 15 are arranged in at least one row and side by side in a direction of the diameter of the wires 15. The "at least one row" means that the wires 15 may be arranged in a plurality of rows, in which case the sets of wires of the different rows are spaced from each other.

The stopper 13 is molded integrally with the set of wires 11 so as to surround a portion, in its extending direction, of the set of wires 11. The stopper 13 is molded integrally with the set of wires 11 so as to have an outer circumferential shape defining portion 17 that conforms to the inner circumferential shape of a wire passage portion 19 (described later) and a pair of side surfaces 13a and 13b that are arranged in the extending direction of the set of wires 11. The molding is performed using a low-pressure injection molding machine and a hard resin material such as a general engineering plastic. In other words, the water blocking structure is configured such that a set of wires 11 is insert-molded in a member made of such an engineering plastic.

Figure 1B:
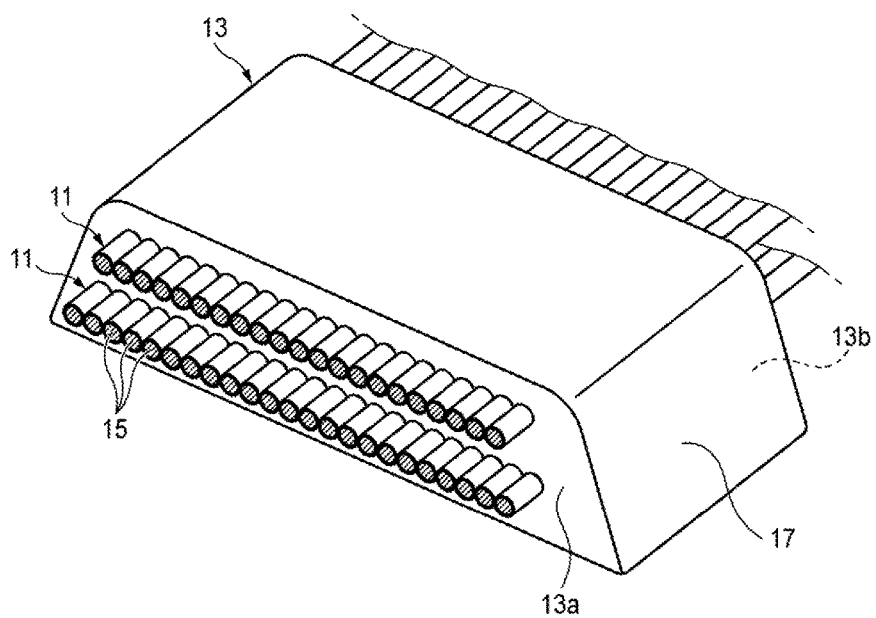
FIG. 1B a perspective view of a water blocking structure according to an exemplary embodiment of the present invention, in which a stopper is provided for two sets of wires arranged in separate rows.

As shown in FIG. 1B, sets of wires 11 may be arranged in a plurality of rows so as to be spaced from each other in the direction (top-bottom direction in FIG. 1B) that intersects the direction in which the wires 15 are arranged side by side. Although the sets of wires 11 are arranged in two rows in the illustrated example, they may be arranged in three or more rows. The reason for spacing the sets of wires 11 is to prevent formation of resin-uncharged spaces 70 (described later) each of which is surrounded by three or more wires 15.

Figure 2A:
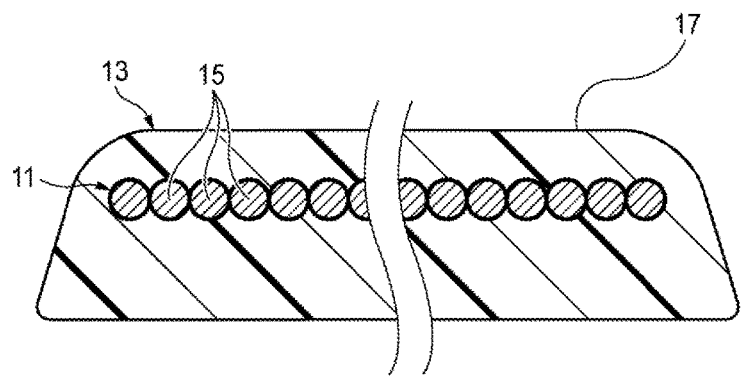
FIG. 2A is a cross sectional view of the water blocking structure of FIG. 1A.
Figure 2B:
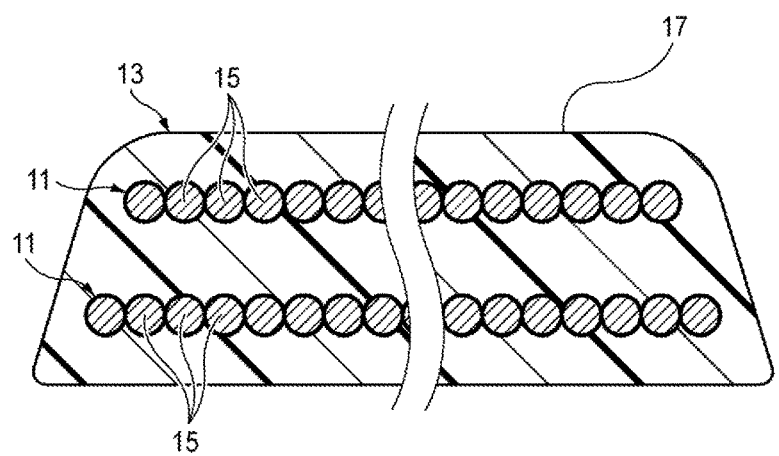
FIG. 2B is a cross sectional view of the water blocking structure of FIG. 1B.

The stopper 13 may be molded so that its outer circumferential shape defining portion 17 assumes, for example, a trapezoidal shape in a sectional view as in the illustrated examples. However, the shape of the outer circumferential shape defining portion 17 of the stopper 13 is not limited to it. Where the set of wires 11 is of one stage, the stopper 13 is molded so as to assume a low-height trapezoidal shape as shown in FIG. 2A. In a case in which the sets of wires 11 are arranged in multiple rows, the stopper 13 is molded so as to assume a tall trapezoidal shape as shown in FIG. 2B. Adjoining ones of the wires 15 belonging to each row may either be spaced from each other slightly or be in contact with each other. This is because if adjoining wires 15 are spaced from each other slightly, resin goes into the space between them and their neighboring outer circumferential surfaces are surrounded by resin and water entrance prevention is thus made there. And if adjoining wires 15 are in contact with each other, this can serve as a water entrance preventive measure in itself.

Figure 4:
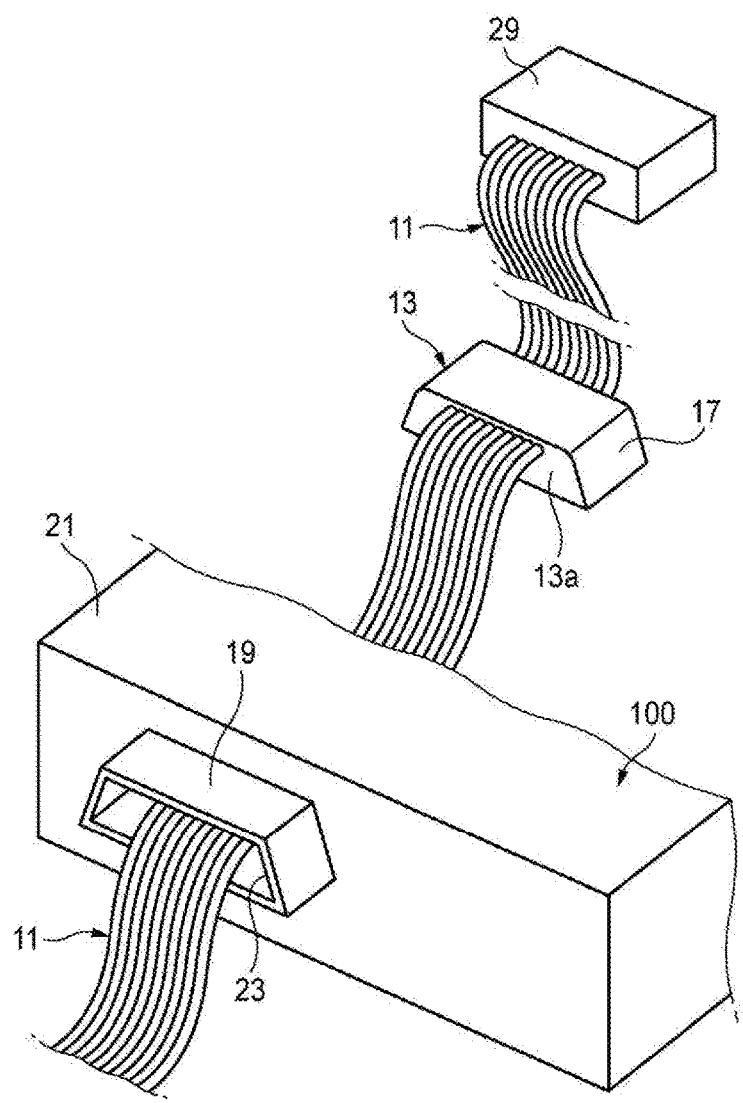
FIG. 4 is an exploded perspective view, illustrating an arrangement for a connection with a device using a wire harness having the water blocking structure of FIG. 1A.

As shown in FIG. 4, a wire passage portion 19 through the set of wires 11 which is surrounded by the stopper 13 is to penetrate is provided in, for example, an integral case 21 (partition walls) of a waterproofing box 100. The wire passage portion 19 is shaped like a pipe having a through-hole 23 that is trapezoidal in a front view. The stopper 13 is molded so that the outer circumferential shape defining portion 17 assumes a shape that conforms to the inner circumferential shape of the wire passage portion 19. In this case, the stopper 13 is fitted into the through-hole 23 after one end portion of the set of wires 11 has passed through the through-hole 23. In this case, the stopper 13 is formed so as to have the same sectional shape at any position in the insertion direction. Incidentally, a water-stop preventive measure may be taken between the inner circumferential surface of the through-hole 23 and the outer circumferential shape defining portion 17 of the stopper 13 by bonding a water-stop member such as a sealing sponge or a rubber member to the former.

The outer circumferential shape defining portion 17 of the stopper 13 may have tapered surfaces the distance between which decreases as the position goes in the insertion direction. With this measure, the stopper 13 can be brought into closer contact with the inner circumferential surface of the through-hole 23 because of the pressure of inserting the stopper 13 into the wire passage portion 19, whereby high waterproof performance can be obtained.

Figure 5:
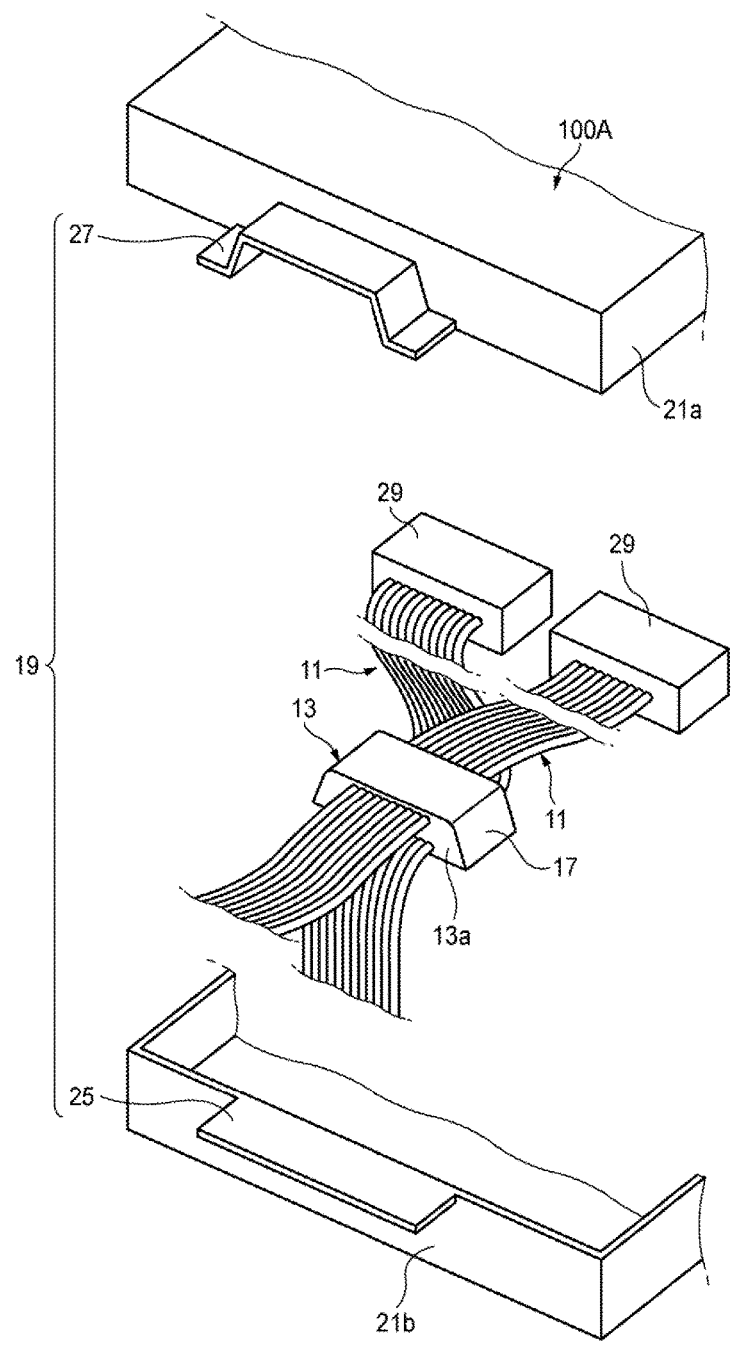
FIG. 5 is an exploded perspective view, illustrating an arrangement for a connection with a device using a wire harness having the water blocking structure of FIG. 1B.

As shown in FIG. 5, another wire passage portion 19 is possible which has a divisional structure that it is separately provided in top and bottom cases (partition walls) 21a and 21b of a waterproofing box 100A. More specifically, the wire passage portion 19 may be such as to form a pipe shape that defines a trapezoidal through-hole 23 when a bottom plate 25 that is formed in the bottom case 21b and a mountain-shaped brim 27 that is formed in the top case 21a are combined with each other. In this case, the stopper 13 is placed on the bottom plate 25 and then covered with the mountain-shaped brim 27, whereby the stopper 13 is fixed being held between the bottom plate 25 and the mountain-shaped brim 27. The stopper 13 is held either by fixing the divisional top and bottom cases 21a and 21b to each other using a fastening tool (not shown) or by fixing the bottom plate 25 and the mountain-shaped brim 27 to each other using a fastening tool.

For example, an electronic device (not shown) is housed in the integral case 21 of the waterproofing box 100 shown in FIG. 4. A connector 29 that is connected to one end of the set of wires 11 is connected to the electronic device. The connector 29 is housed in the integral case 21, and a portion, leading out of the wire passage portion 19 of the integral case 21, of the set of wires 11 is subjected to the water entrance preventive measure using the stopper 13. Thus, the connector 29 is housed in the water-entrance-prevented case.

In the case of FIG. 5 in which connectors 29 of the two sets of wires 11, for example, are connected to electronic device (not shown) housed in the top and bottom cases 21a and 21b of the waterproofing box 100A, the sets of wires 11 are subjected to the water entrance preventive measure using the stopper 13 in a state in which the sets of wires 11 extend parallel with each other and are arranged vertically in two rows. In this manner, when the number of sets of wires 11 for connection is increased, the sets of wires 11 are arranged in the stopper 13 in the same number of rows. In this manner, a water entrance preventive measure is taken in a concentrated manner using the stopper 13 in the wire passage portion 19 of the waterproofing box 100A.

As described above, the waterproofing box 100 (100A) with the water blocking structure according to the exemplary embodiment can restrict water from entering inside the waterproofing box 100 from outside the case through the wire passage portion 19 through which the set of wires 11 are led out.

Figure 6:
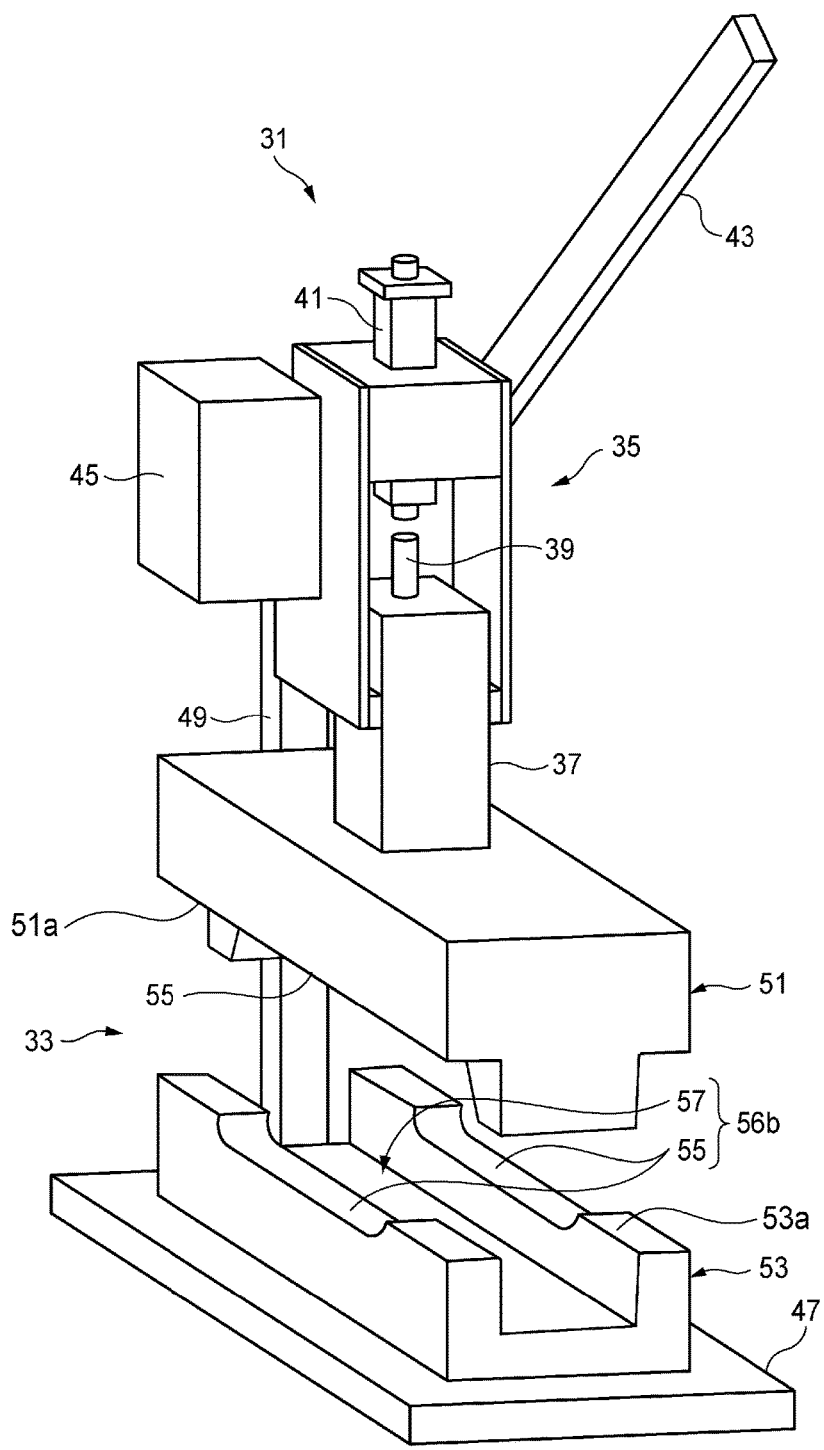
FIG. 6 is a perspective view of a low-pressure injection molding machine.

FIG. 6 is a perspective view of a low-pressure injection molding machine.

A low-pressure injection molding machine 31 for molding a stopper 13 so that it is integrated with a set of wires 11 is a molding machine that can be manipulated by one operator without receiving any external motive power from a motor or the like, and includes a molding die 33, a die clamping device (not shown), and a low-pressure injection machine 35 for pressurizing and injecting, into the molding die 33, molten resin.

The low-pressure injection machine 35 has a heating cylinder 37 having a heater for melting synthetic resin or the like by heating it, a plunger 39 for ejecting molten resin in the heating cylinder 37 through a nozzle (not shown), an injection cylinder 41 for advancing the plunger 39, a handle 43 for driving the injection cylinder 41, and a temperature adjuster 45 for keeping the heating temperature of the heating cylinder 37 at a desired temperature. These components are supported by a machine post 49 that is erected from a pedestal 47.

The low-pressure injection molding machine 31 may be configured such that a maximum amount of resin that can be molded in a single injection molding operation is about 10 grams. At the time of clamping the molding die 33, the low-pressure injection molding machine 31 may be manually operated using an air cylinder, a link or the like. The low-pressure injection machine 35 may be configured such that the injection cylinder 41 is driven by external power, such as a motor or air. More specifically, the low-pressure injection molding machine 31 may be configured in a similar manner as the injection molding machines disclosed in, for example, JP2010-260297A, JP2012-030429A and JP2013-103492A.

The molding die 33 employed in the exemplary embodiment is disposed on the pedestal 47. In the molding die 33, an upper die 51 and a lower die 53 are fitted with each other so that a set of wires 11 is held between them and contained in burr-cutting portions 55 (see FIGS. 6 and 8A) that are formed in their outer end portions arranged in the extending direction of the set of wires 11, whereby a molding space as a cavity that enables molding of a stopper 13 is defined (die clamping).

More specifically, in the upper die 51 and the lower die 53, an upper die parting surface (parting surface) 51a and a lower die parting surface (parting surface) 51b are formed with harness receiving portions 56a and 56b which have a cavity 57 for molding of a stopper 13 and flat burr-cutting portions 55 for holding outside portions of a one-row set of wires 11. The burr-cutting portions 55 are formed in outer end portions that are located outside the cavity 57 on both sides in the extending direction of the one-row set of wires 11 (the left-right direction in FIG. 6). Each burr-cutting portion 55 of the lower die 53 has a concave portion capable of containing a one-row set of wires 11, and its depth as measured from the lower die parting surface 53a is approximately equal to the diameter of each wire 15. On the other hand, each burr-cutting portion 55 of the upper die 51 is flat and flush with the upper die parting surface 51a.

Configured in this manner, the upper die 51 and the lower die 53 can be fastened to each other in a state in which a one-row set of wires 11 is contained in the concave portions of the respective burr-cutting portions 55 of the lower die 53. As a result, the set of wires 11 can easily be set in the harness receiving portion 56b and an improper nip of wires is not prone to occur at the time of die clamping.

Molten resin is supplied to the cavity 57 via a supply path and a gate 52 (see FIG. 8A), whereby a stopper 13 is molded around the set of wires 11.

In the molding using the low-pressure injection molding machine 31, when molten resin is injected into the cavity 57 of the molding die 33 at a low pressure in a state in which a set of wires 11 is held between the burr-cutting portions 55 of the upper die 51 and the lower die 53, a prescribed amount of molten resin (i.e., an amount of thermoplastic resin necessary for molding of a stopper 13) goes into the cavity 57 (injecting step).

The temperature of the molten resin injected in the cavity 57 decreases and its setting becomes faster as the position comes closer to injection ends, and the die temperature is lower than a thermoplastic resin melting temperature in the vicinities of the burr-cutting portions 55. Molten resin that has set at the injection ends has a sealing function itself. Since molten resin is injected into the cavity 57 by the low-pressure injection machine 35, it is flowable but its flowability is not so high as to leak out in a large amount through small gaps between the flat burr-cutting portions 55 and the adjacent wires 15

As a result, molten resin does not leak out in a large amount through the gaps between the flat burr-cutting portions 55 and the adjacent wires 15, and hence it is not necessary that the burr-cutting portions 55 be provided with structures or members for blocking resin as in conventional molding dies.

As a result, the molding die 33 is given a simple structure and the manufacturing cost can be reduced. Furthermore, even if the position, in the width direction, of a set of wires 11 held between the burr-cutting portions 55 of the upper die 51 and the lower die 53 varies to some extent, the molding die 33 can accommodate the position variation flexibly because the gaps between the burr-cutting portions 55 and the set of wires 11 are sealed by solidified resin.

Still further, cooling mechanisms (not shown) for cooling injection end portions of molten resin injected in the cavity 57 may be disposed in the vicinities of the burr-cutting portions 55 of the molding die 33. For example, the cooling mechanisms are disposed outside the molding die 33 at positions corresponding to the burr-cutting portions 55. For example, the cooling mechanisms may be of an air cooling type using cooling fins or a cool wind blower, of a water cooling type using cooling water pipes, or of an electronic cooling type using Peltier devices. The cooling mechanisms make it possible to make the temperatures of injection end portions of molten resin lower than normal temperature quickly, to thereby accelerate the setting of molten resin locally.

Although in the exemplary embodiment the molding die 33 is of the horizontal division type, it may be of a vertical division type.

According to the water blocking structure described above, the stopper 13 is molded integrally with a set of wires 11 of one row or sets of wires 11 of two rows so as to surround its or their portions in its or their extending direction.

Figure 7A:
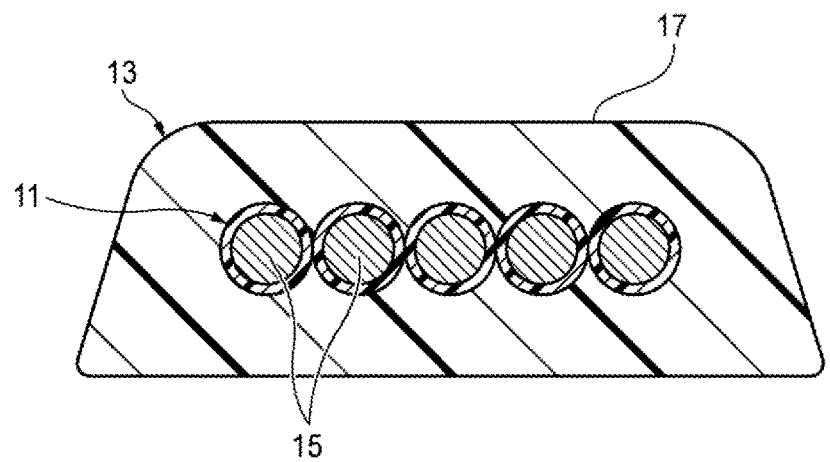
FIG. 7A is a sectional view of a set of wires arranged in a row and covered with resin.

As shown in FIG. 7A, the outer circumferential shape defining portion 17 of the stopper 13 is formed so as to assume a prescribed shape (in the exemplary embodiment, a trapezoidal shape in a sectional view) that conforms to the inner circumferential shape of the wire passage portion 19. That is, the stopper 13 is formed so as to have a desired shape that conforms to the opening shape of the wire passage portion 19.

Figure 7B:
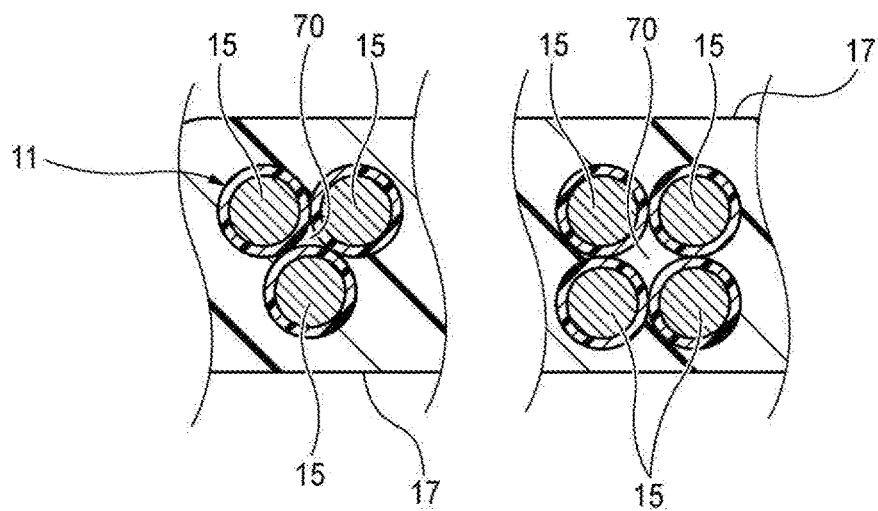
FIG. 7B is a sectional view illustrating a bundle of three or more wires covered with resin.

Since the set of wires 11 is formed by arranging a plurality of wires 15 in one row side by side in a direction of the diameter of the wires 15, as shown in FIG. 7B no resin-uncharged interstice 70 is formed that is surrounded by three of more wires 15. Thus, the space between adjoining wires 15 is filled and the entrance of water into the space between adjoining wires 15 can be prevented reliably.

The water blocking structure can realize a state that is close to complete waterproof by using, as the hard resin material of the stopper 13, a material that is adherent to the wire coating. Although portions where wires 15 are in contact with each other occur unavoidably, they are very small and the wires 15 are in close contact there. Thus, high water entrance prevention performance is attained. However, from the viewpoint of uses of the stopper 13, it is appropriate to select a material that is inexpensive and easy to mold and it is not always necessary to realize complete waterproof.

Being made of a hard resin such as an engineering plastic and hence being rigid, the stopper 13 can be fixed, with prescribed strength, to the integral case 21 or the top and bottom cases 21a and 21b which is or are partition walls formed with the wire passage portion 19. Water entrance through the space between the stopper 13 and the wire passage portion 19 can be prevented by bonding a sealing sponge or a rubber member to the inner circumferential surface of the wire passage portion 19.

The stopper 13 is molded in an integrated manner using hard resin that is ejected at a low pressure from the low-pressure injection molding machine 31 which is different from ordinary injection molding machines. In the molding by the low-pressure injection molding machine 31, the ejection pressure of molten resin is lower than in the molding by ordinary injection molding machines and hence the influence of heat on the wires 15 during molding of the stopper 13 can be suppressed. Furthermore, in the molding by the low-pressure injection molding machine 31, the scale of a facility can be made smaller than in the molding by ordinary injection molding machines.

With the water blocking structure described above, since molten resin is not prone to leak out while the stopper 13 is molded so as to surround the set of wires 11, the small gaps between the flat burr-cutting portions 55 of the molding die 33 and the wires 15 adjacent to them can be kept open. In this case, a good water-stop preventive structure can be obtained by restricting the wires 15 to narrow wires of 0.35 sq or less with a very small wire diameter variation.

As described above, in the manufacturing method of a wire harness according to the exemplary embodiment, since the stopper 13 is molded at a low pressure by the low-pressure injection molding machine 31, molten resin is injected at a low pressure and hence is not prone to leak out. This will be described below in a more specific manner. When a set of wires 11 of one row is set in the harness receiving portion 56b of the lower die 53 and the upper die 51 and the lower die 53 are fastened to each other so that the one-row set of wires 11 is held between, parallel with them, the flat burr-cutting portions 55 which are formed in the outer end portions located outside the cavity 57 on both sides in the extending direction of the set of wires 11. Molten resin is injected into the cavity 57 at a low pressure in a state in which the gaps between the flat burr-cutting portions 55 and the wires 15 adjacent to them are kept open. At this time, since the molten resin is injected into the cavity 57 at a low pressure and hence is not prone to leak out, leakage through the gaps between the flat burr-cutting portions 55 and the wires 15 adjacent to them is prevented to suppress formation of burrs.

Figure 9:
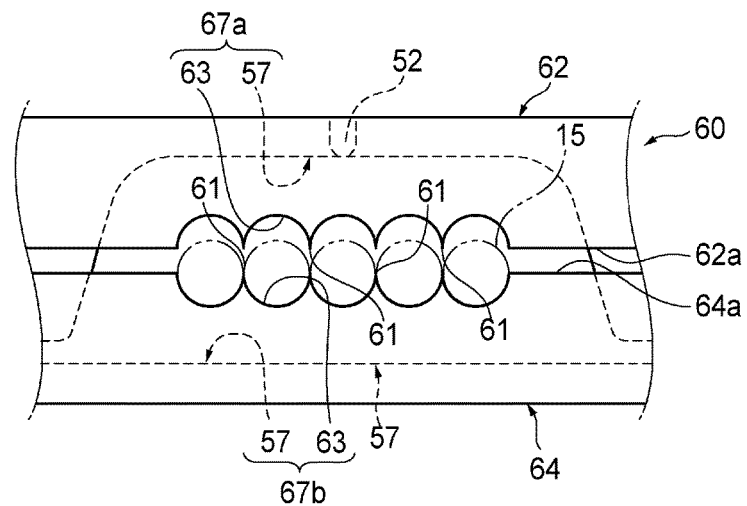
FIG. 9 is a front view of a molding die of a comparative example having burr-cutting portions each of which having a plurality of projections having sharp tips.

Therefore, it is not necessary to provide burr-cutting portions 63 each of which has a plurality of projections 61 having sharp tips and is to be brought into close contact with the outer circumferential surfaces of the wires 15 as in harness receiving portions 67a and 67b that are formed in an upper die parting surface 62a of an upper die 62 and a lower die parting surface 64a of a lower die 64 of a molding die 60 of a comparative example shown in FIG. 9.

Figure 3:
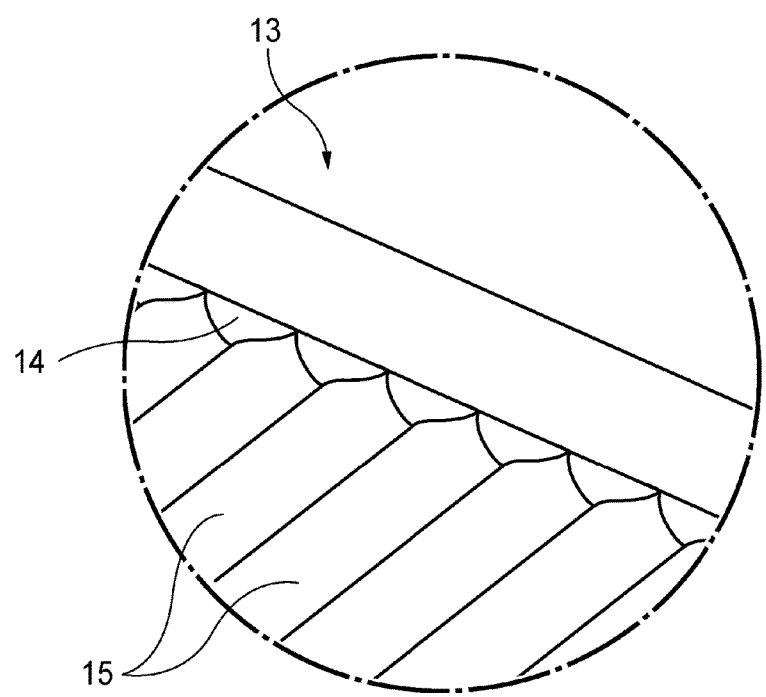
FIG. 3 is an enlarged view of the portion A in FIG. 1A.
Figure 8A:
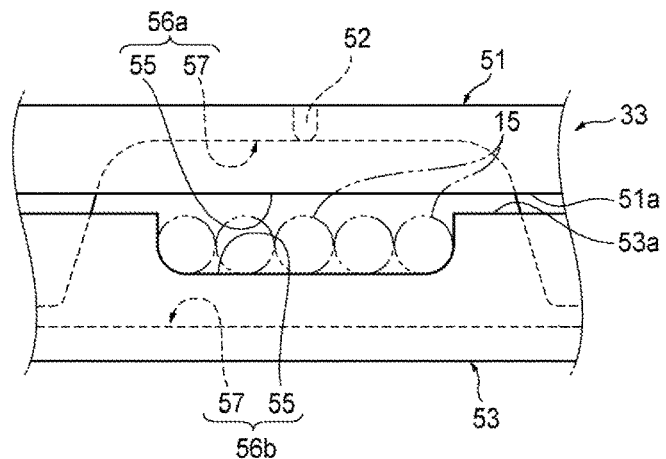
FIG. 8A is a front view of an example of a molding die having flat burr-cutting portions.

Therefore, as shown in FIG. 8A, the molding die 33 employed in the exemplary embodiment can suppress formation of burrs even if the burr-cutting portions 55 of the upper die 51 and the lower die 53 assume shapes that are close to flat shapes. This will be described below in a more specific manner. When molten resin is injected into the cavity 57 in a state in which small gaps are provided between the flat burr-cutting portions 55 and wires 15 adjacent to the burr-cutting portions 55, a portion of the molten resin that has leaked slightly out of the cavity 57 through the gaps solidifies immediately to form a caulking portion 14 (see FIG. 3), whereby further leakage of molten resin from the cavity 57 is prevented. And it becomes possible to charge molten resin into the cavity 57 at a prescribed pressure. As a result, there is no probability that the coatings of the wires 15 are scratched when the set of wires 11 is set in the harness receiving portions 56a and 56b of the molding die 33. This makes careful handling unnecessary and hence increases the efficiency of work of molding the stopper 13 of the water blocking structure. Thus, a water blocking structure can be realized with an inexpensive facility by easy work.

Figure 8B:
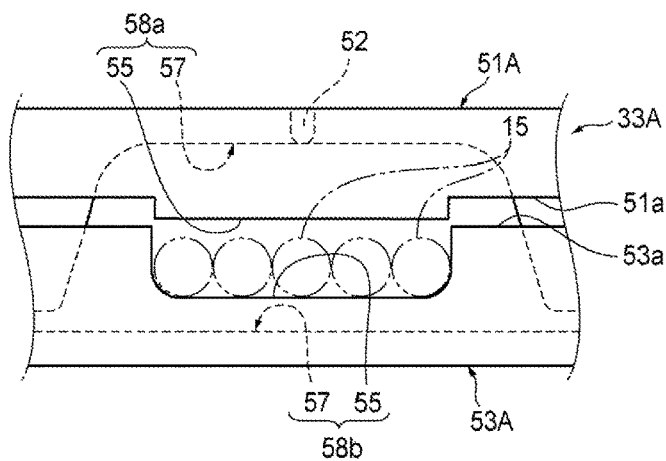
FIG. 8B is a front view of another example of a molding die having flat burr-cutting portions.

In a molding die 33A according to a modification of the exemplary embodiment shown in FIG. 8B, each burr-cutting portion 55 of a harness receiving portion 58b of a lower die 53A has a concave portion capable of containing a set of wires 11 of one row and its depth from a lower die parting surface 53a is greater than the diameter of each wire 15. On the other hand, each burr-cutting portion 55 of a harness receiving portion 58a of an upper die 51A has a convex portion to fit into the associated concave portion and projects from an upper die parting surface 51a by a prescribed length. In a die clamping step, the one-row set of wires 11 that is contained in the burr-cutting portions 55 of the lower die 53A is pressed and urged in the holding direction by the convex portions of the burr-cutting portions 55 of the upper die 51A.

Therefore, in the manufacturing method of a wire harness that employs the molding die 33A of the exemplary embodiment, the upper die 51A and the lower die 53A can be fastened to each other in a state in which a set of wires 11 of one row is contained in the concave portions of the burr-cutting portions 55 of the lower die 53A. Therefore, the set of wires 11 can easily be set in the harness receiving portion 58b and an improper nip of wires is less prone to occur at the time of die clamping, whereby the efficiency of work of molding the stopper 13 of the water blocking structure is further increased.

At the time of die clamping, the set of wires 11 of one row that is housed in the concave portions of the burr-cutting portions 55 is pressed and urged in the holding direction by the convex portions of the burr-cutting portions 55 of the upper die 51A. As a result, the coatings of the wires 15 are crushed through elastic deformation, whereby the gaps between the flat burr-cutting portions 55 and the wires 15 adjacent to them can be decreased and the wires 15 of the one-row set of wires 11 are arranged beautifully, which means an enhanced appearance.

Figure 8C:
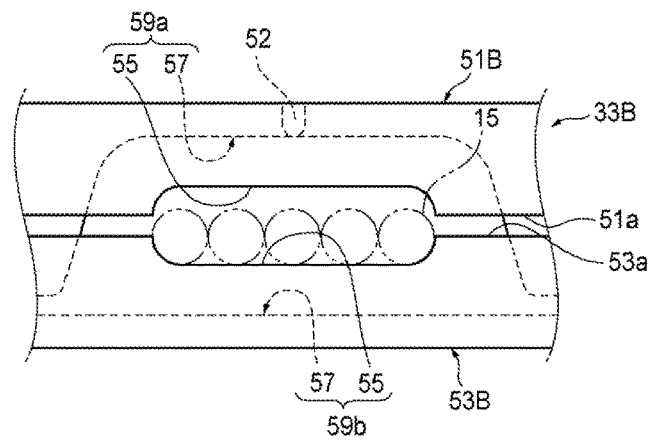
FIG. 8C is a front view of another example of a molding die having flat burr-cutting portions.

In a molding die 33B according to another modification of the exemplary embodiment shown in FIG. 8C, each burr-cutting portion 55 of a harness receiving portion 59b of a lower die 53B has a first concave portion capable of arranging the wires 15 of a set of wires 11 of one row and its depth from a lower die parting surface 53a is approximately half of the diameter of each wire 15. On the other hand, each burr-cutting portion 55 of a harness receiving portion 59a of an upper die 51B has a second concave portion that is opposed to the associated first concave portion and its depth from an upper die parting surface 51a is approximately half of the diameter of each wire 15. In a die clamping step, the one-row set of wires 11 that is contained in the burr-cutting portions 55 of the lower die 53B is pressed and urged in the holding direction by the second concave portions of the burr-cutting portions 55 of the upper die 51B.

Therefore, in the manufacturing method of a wire harness that employs the molding die 33B of the exemplary embodiment, the upper die 51B and the lower die 53B can be fastened to each other in a state in which the wires 15 of a set of wires 11 of one row are arranged in the first concave portions of the burr-cutting portions 55 of the lower die 53B. Since the set of wires 11 can easily be set in the harness receiving portion 59b, the efficiency of work of molding the stopper 13 of the water blocking structure is increased.

According to the water blocking structure illustrated in FIGS. 1B and 5, the sets of wires 11 are arranged in a plurality of rows so as to be spaced from each other in the direction that intersects the direction in which the wires 15 are arranged side by side. As a result, even in the case where the number of wires 15 is larger than the number of wires 15 constituting a set of wires 11 of one row, a stopper 13 that is high in water entrance prevention performance can be molded without forming resin-uncharged interstices 70.

Figure 10:
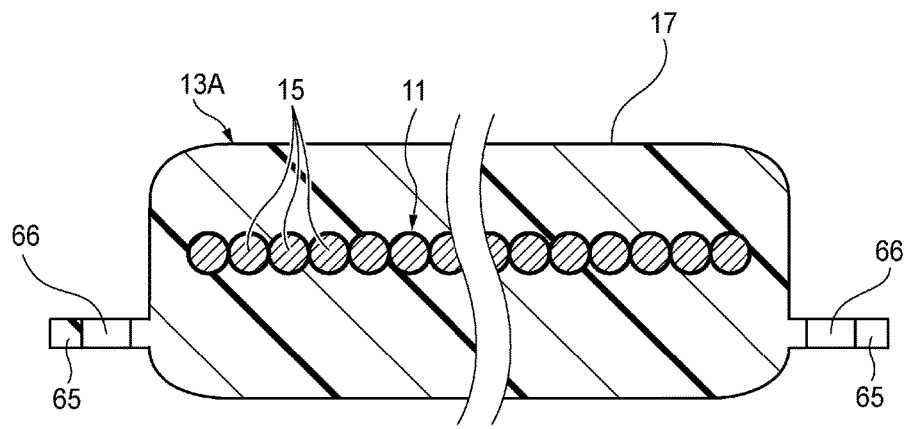
FIG. 10 is a cross sectional view of a stopper that is molded integrally with engagement portions to be engaged with a partition wall.

As shown in FIG. 10, a stopper 13A of a water blocking structure according to another exemplary embodiment has integrally molded engagement portions 65 to be engaged with the integral case 21 of the water-stop case 100 formed with the wire passage portion 19. The engagement portions 65 are a pair of fixing flanges that project from the two respective ends, in the width direction, of the stopper 13A and have respective screw holes 66.

With this water blocking structure, since the engagement portions 65 to be engaged with the integral case 21 which is formed with the wire passage portion 19 is molded integrally with the stopper 13 using a hard resin, the stopper 13 can be fixed directly to the wire passage portion 19. That is, the stopper 13 can be fixed strongly to the waterproofing box 100 by screwing, into the integral case 21, attachment screws that are inserted through the screw holes 66 of the engagement portions 65, respectively.

The engagement portions 65 employed in the exemplary embodiment are not limited to fixing flanges and may be members having attachment shapes or positioning shapes that are suitable for the integral case 21. Furthermore, nuts, bolts, or the like may be insert-molded in the respective engagement portions 65.

The water blocking structure can accommodate stopper 13 having any shape as long as it can be molded in the cavity 57 of the molding die 33 because the die 13 is molded by injecting molten resin into the cavity 57 of the molding die 33 at a low pressure. For example, it is possible to form a water blocking structure in which a stopper is fitted in a pipe portion of a grommet having a circular wire passage portion by shaping the outer circumferential shape defining portion of the stopper into a cylindrical shape. Even in this case, the circular stopper can be provided with sets of wires 11 in any number of rows.

Figure 11A:
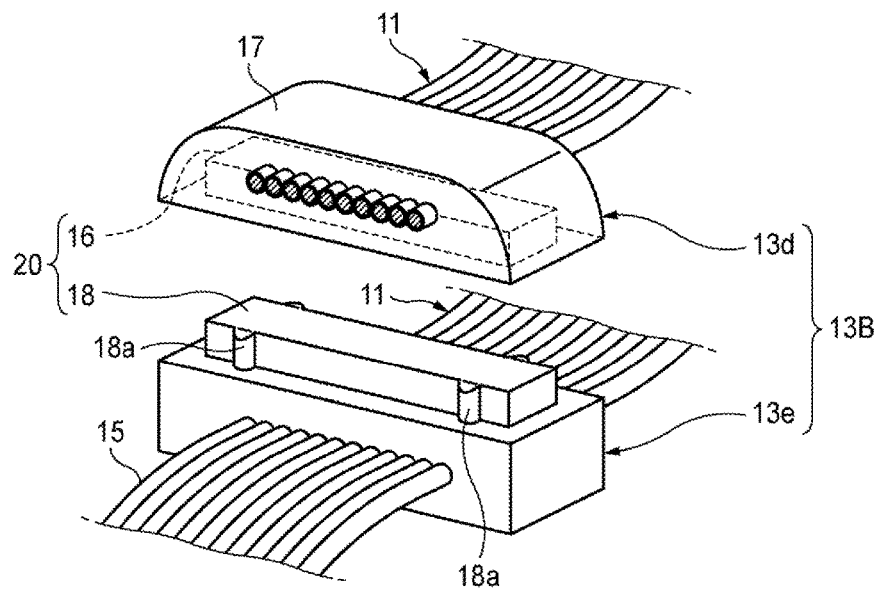
FIG. 11A is an exploded perspective view of an example of stopper members that are molded integrally with engagement portions for combining.

A stopper 13B of a water blocking structure o shown in FIG. 11A is formed by combining together a pair of stopper members 13d and 13e which are molded integrally with respective constituent members (engagement portions for combining) of a fitting structure 20.

The fitting structure 20 consists of a fitting recess 16 which is recessed in the bottom surface of the stopper member 13d and a fitting projection 18 which projects from the top surface of the stopper member 13e. The stopper 13B is formed by combining the stopper members 13d and 13e together directly by press-fitting the fitting projection 18 into the fitting recess 16.

In the exemplary embodiment, each side surface of the fitting projection 18 is formed with a plurality of press-fit ribs 18a, which are crushed at the time of press fitting and can thereby facilitate and ensure the press-fitting of the fitting projection 18 into the fitting recess 16.

With this water blocking structure, the pair of stopper members 13d and 13e that are molded integrally with respective sets of wires 11 are combined together, whereby the plurality of sets of wires 11 are arranged in a plurality of rows so as to be spaced from each other in the direction that intersects the direction in which the wires 15 are arranged side by side. As a result, even in the case where the number of wires 15 is larger than the number of wires 15 constituting a set of wires 11 of one row, a stopper 13B that is high in water entrance prevention performance can be formed without forming resin-uncharged interstices 70.

Figure 11B:
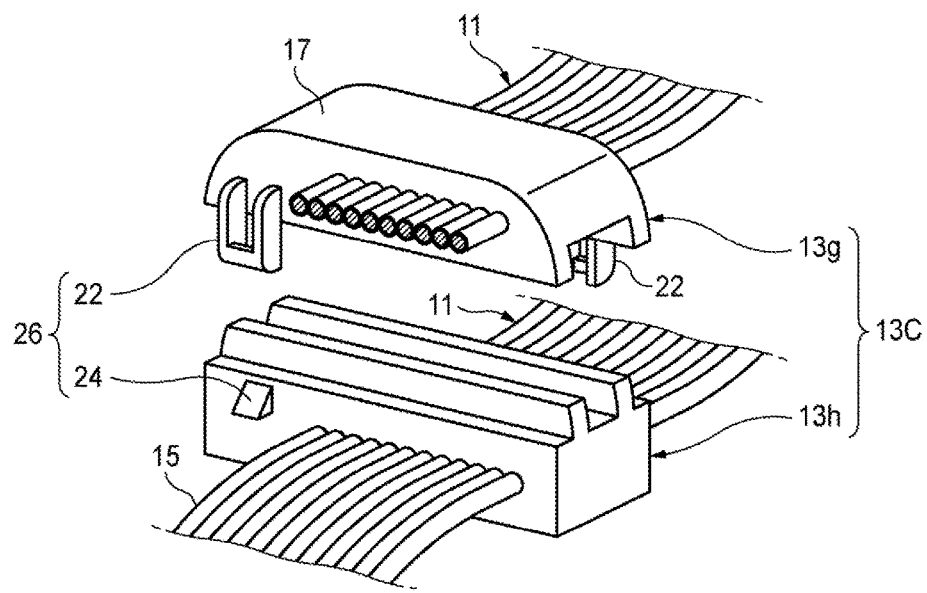
FIG. 11B is an exploded perspective view of another example.

A stopper 13C of a water blocking structure shown in FIG. 11B is formed by combining together a pair of stopper members 13g and 13h each of which is molded integrally with constituent members (engagement portions for combining) of lock mechanisms 26.

Each lock mechanism 26 consists of a lock arm 22 that projects from a side surface of the stopper member 13g and a lock projection 24 that projects from a side surface of the stopper member 13h. The stopper 13C is formed by combining the stopper members 13g and 13h together directly by locking the lock arms 22 on the respective lock projections 24.

Although in the exemplary embodiment the pair of lock mechanisms 26 are provided on the side surfaces of the stopper 13C at diagonal positions, two or more pairs of lock mechanisms 26 may be provided on the side surfaces of the stopper 13C.

With this water blocking structure, the pair of stopper members 13g and 13h that are molded integrally with respective sets of wires 11 are combined together, whereby the plurality of sets of wires 11 are arranged in a plurality of rows so as to be spaced from each other in the direction that intersects the direction in which the wires 15 are arranged side by side. As a result, even in the case where the number of wires 15 is larger than the number of wires 15 constituting a set of wires 11 of one row, a stopper 13C that is high in water entrance prevention performance can be formed without forming resin-uncharged interstices 70.

The stopper members 13d and 13e (or 13g and 13h) are molded integrally with portions, in their extending direction, of a plurality of sets of wires 11 so as to surround those portions, respectively, and then combined together into the stopper 13 (or 13C) to form the water blocking structure. Therefore, there may occur a case that the fitting direction of the stopper members 13d and 13e (or 13g and 13h) is prescribed. Therefore, the fitting direction of the stopper members 13d and 13e (or 13g and 13h) to be combined together may be provided with an erroneous-fitting preventive mechanism consisting of asymmetrical rib projections and rib containing recesses, for example.

Furthermore, a stopper may be formed by combining three or more stopper members together directly that are molded integrally with respective engagement portions.

Figure 12A:
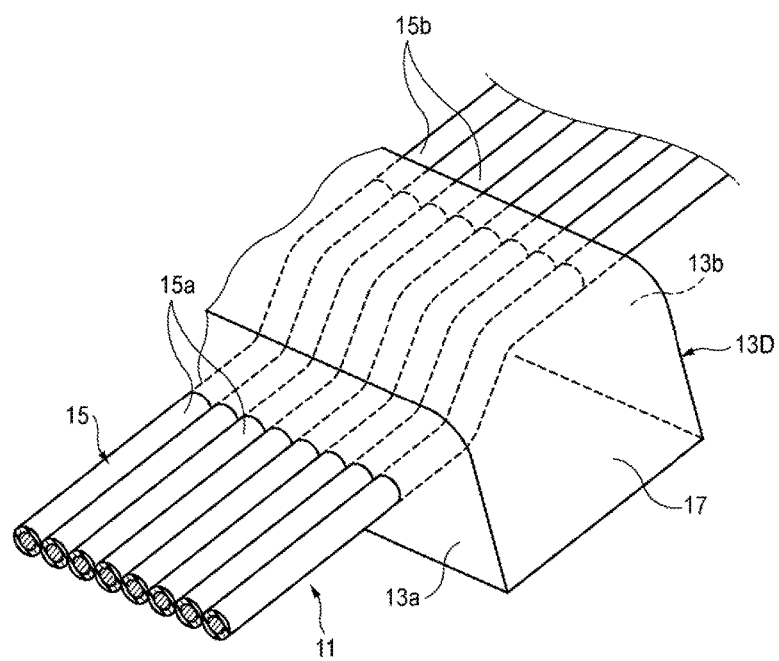
FIGS. 12A and 12B are a perspective view of a water blocking structure according to another exemplary embodiment of the present invention.
Figure 12B:
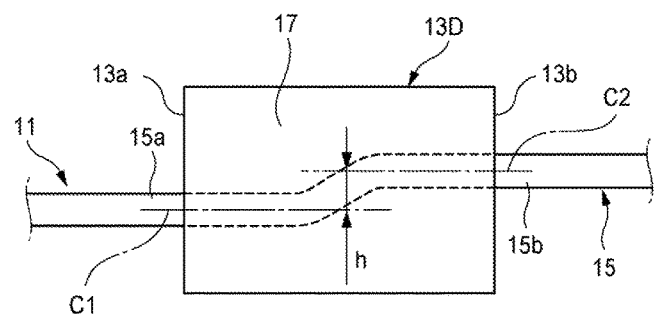

A stopper 13D of a water blocking structure shown in FIGS. 12A and 12B is molded in an integrated manner so as to have an outer circumferential shape defining portion 17 which conforms to the inner circumferential shape of the wire passage portion 19 and a pair of side surfaces 13a and 13b arranged in the extending direction of a set of wires 11. Projection portions 15a of respective wires 15 project from the side surface 13a of the stopper 13D, and projection portions 15b of the respective wires 15 project from the side surface 13b of the stopper 13D. A center axis C1 of the projection portions 15a and a center axis C2 of the projection portions 15b are displaced from each other by a dimension h in the height direction (the top-bottom direction in the figure).

Therefore, the portions, buried in the stopper 13D, of the respective wires 15 do not extend straightly but are curved freely to some extent to increase friction, as a result of which the stopper 13D's ability to hold the wires 15 against a load of pulling out the wires 15 is made higher than in a case that portions of wires 15 are buried so as to extend straightly. As a result, the stopper 13D can increase the ability to hold the wires 15 against a load of pulling them out without the need for selecting a material that is adherent to the coatings of the wires 15.

Figure 13:
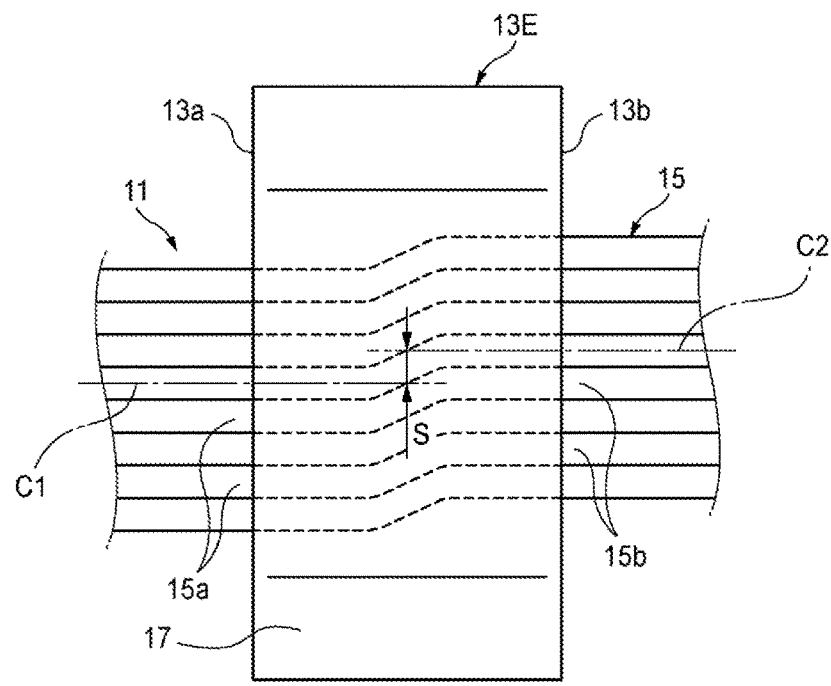
FIG. 13 is a plan view of a water blocking structure according to another exemplary embodiment of the present invention.

In a stopper 13E of a water blocking structure shown in FIG. 13, center axes C1 and C2 of portions 15a and 15b of wires 15 passing through and projecting from a pair of side surfaces 13a and 13b on sides along the extending direction of a set of wires 11 are displaced from each other by a dimension s in the width direction (top-bottom direction in FIG. 13).

Therefore, the portions, buried in the stopper 13E, of the respective wires 15 do not extend straightly but are curved freely to some extent to increase friction, as a result of which the stopper 13E's ability to hold the wires 15 against a load of pulling them out is made higher than in a case that portions of wires 15 are buried so as to extend straightly.

The center axes C1 and C2 of the projected portions 15a and 15b of wires 15 are displaced from each other so as not to form a straight line. The deviation direction is not restricted to the above-mentioned height direction or width direction.

In molding the stopper 13D or 13E, the positions where the burr-cutting portions 55 which are formed in the upper die 51 and the lower die 53 of the above-described molding die 33 (see FIG. 6) in the outer end portions located outside the cavity 57 on both sides in the extending direction of a set of wires 11 be offset from each other. The positions of the portions, located in the cavity 57, of the wires 15 which are held by the burr-cutting portions 55 need not be set accurately, and these portions of the wires 15 do not extend straightly in the cavity 57.

Figure 14:
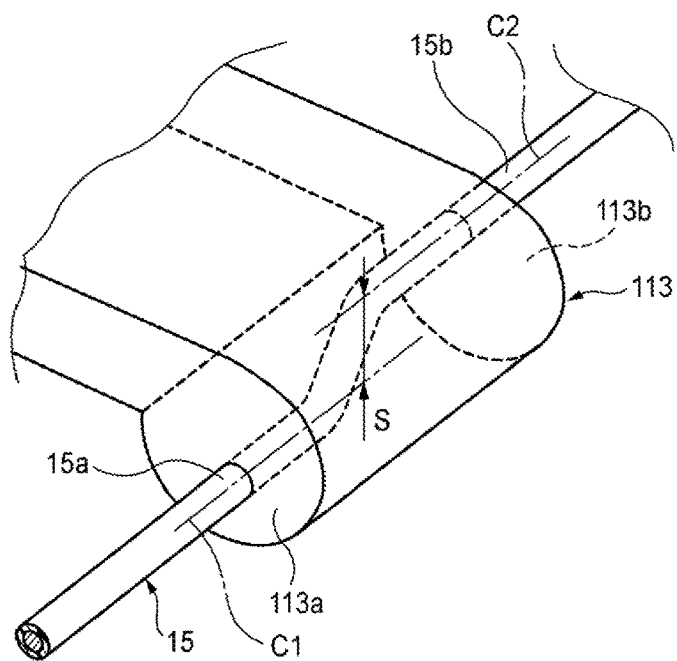
FIG. 14 is a perspective view of a wire harness according to a reference example of the present invention.

A wire harness according to a reference example of the invention shown in FIG. 14 is equipped with a wire 15 and a wire-embedded body 113 which is molded integrally with the wire 15 using a hard resin so as to surround a portion, in its extending direction, of the wire 15.

The wire-embedded body 113 is part of each of various products that are molded integrally with the wire 15, such as a clamp and a wire protective member, and is molded so as to have a pair of side surfaces 113a and 113b arranged in the extending direction of the wire 15. Projection portions 15a and 15b of the wire 15 project from the respective side surfaces 113a and 113b of the wire-embedded body 113a, and the center axes C1 and C2 of the respective projected portions 15a and 15b are displaced from each other in the height direction (the top-bottom direction in FIG. 14).

The portion, buried in the wire-embedded body 113, of the wire 15 does not extend straightly but is curved freely to some extent to increase friction, as a result of which the wire-embedded body 113's ability to hold the wire 15 against a load of pulling out the wire 15 is made higher than in a case that a portion of a wire 15 is buried so as to extend straightly. As a result, the wire-embedded body 113 can increase the ability to hold the wire 15 against a load of pulling out it without the need for selecting a material that is adherent to the coating of the wire 15.

In molding the wire-embedded body 113, it suffices that the positions where the burr-cutting portions that are formed in an upper die and a lower die of a molding die (not shown) in outer end portions located outside a cavity on both sides in the extending direction of a wire 15 and serve to hold the wire 15 be offset from each other. The position of the portion, located in the cavity, of the wire 15 whose outside portions are held by the burr-cutting portions need not be set accurately, and this portion of the wire 15 does not extend straightly in the cavity.

As described above, the water blocking structures of a wire harness and the manufacturing methods of a wire harness according to the exemplary embodiments can easily restrict water from entering from the wire passage portion 19.

Some aspects of the water blocking structures of a wire harness and the manufacturing methods of a wire harness according to exemplary embodiments of the present invention will are summarized below.

A water blocking structure of a wire harness is provided. The water blocking structure has a set of wires (11) including a plurality of wires (15) arranged in at least one row and side by side in a direction along a diameter of the wires (15), and an integrally-molded stopper (13) made of a hard resin that is injection molded at a low pressure so as to surround a portion of the set of wires (11) in an extending direction of the wires (15) and to have an outer circumferential shape defining portion (17) that conforms to an inner circumferential shape of a wire passage portion (19) into which the set of wires (11) is to be inserted.

The sets of wires (11) may be arranged in a plurality of rows that are spaced from each other in a direction that intersects the direction in which the wires (15) are arranged side by side.

The stopper (13) may have an integrally molded engagement portion (65) to be engaged with a partition wall (21; 21a. 21b) on which the wire passage portion (19) is provided.

The stopper may include a pair of stopper members (13e, 13d; 13g, 13h) each having an integrally molded engagement portion (fitting structure 20; lock mechanism 26) to be combined it with the counterpart stopper member (13e, 13d; 13g, 13h).

Center axes (C1, C2) of portions (15a, 15b) of the set of wires (11) passing through and projecting from a pair of side surfaces (13a, 13b) of the stopper (13D) on sides extending along the extending direction of the set of wires (11) may be displaced from each other.

The stopper (13) may have a caulking portion (14) provided between the wires (15) and protruding in the extending direction of the wires (15) from a side surface (13a, 13b) of the stopper (13) from which the set of wires (11) extends out from the stopper (13).

A method for manufacturing a wire harness is provided. The wire harness has a set of wires (11) including a plurality of wires (15) arranged in at least one row and side by side in a direction along a diameter of the wires (15), and a stopper (13) that is made of a hard resin, the stopper (13) surrounding a portion of the set of wires (11) in an extending direction of the wires (15) and having an outer circumferential shape defining portion (17) that conforms to an inner circumferential shape of a wire passage portion (19) into which the set of wires (11) is to be inserted. The method includes closing an upper die (51) and a lower die (53) in a state in which a portion of the set of wires (11) is placed in harness receiving portions (56a, 56b) of the upper die (51) and the lower die (53), each of the upper die (51) and the lower die (53) having a parting surface (upper die parting surface 51a, lower die parting surface 53b) at which the harness receiving portion (56a, 56b) is formed, each of the harness receiving portions (56a, 56b) having a cavity (57) for molding of the stopper (13) and flat burr-cutting portions (55) for holding an outer circumference of the set of wires (11) between the upper die (51) and the lower die (53), the burr-cutting portions (55) being provided at outer end portions of the cavity (57) on both sides in the extending direction of the set of wires (11), and injecting the hard resin in a molten state into the cavity (57) at a low pressure.

Each of the burr-cutting portion (55) of the lower die (53) may have a concave portion configured to receive the set of wires (11) and each of the burr-cutting portion (55) of the upper die (51) may have a flat surface portion to be opposed to the associated concave portion, and the closing of the upper die (51) and the lower die (53) includes pressing the set of wires (11) received in the concave portion by the flat surface portions in a direction in which the set of wires (11) is held.

According to another aspect, a wire harness includes a wire (15) and a integrally molded and wire-embedded body (113) made of a hard resin and surrounding a portion of the wire in an extending direction of the wire. Center axes (C1, C2) of portions (15a, 15b) of the wire (15) projecting from a pair of side surfaces (113a, 133b) of the wire-embedded body on sides along the extending direction of the wire (15) are displaced from each other.

While the present invention has been described with reference to a certain exemplary embodiment thereof, the scope of the present invention is not limited to the exemplary embodiment described above, and it will be understood by those skilled in the art that various changes and modifications may be made therein without departing from the scope of the present invention as defined by the appended claims.

What is claimed is:

1. A method for manufacturing a wire harness, the wire harness having a set of wires including a plurality of wires arranged in at least one row and side by side in a direction along a diameter of the wires, and a stopper that is made of a hard resin, the stopper surrounding a portion of the set of wires in an extending direction of the wires and having an outer circumferential shape defining portion that conforms to an inner circumferential shape of a wire passage portion into which the set of wires is to be inserted, the method comprising:

closing an upper die and a lower die in a state in which a portion of the set of wires is placed in a harness receiving portion formed at a parting surface of the upper die and the lower die, the upper die and the lower die having a cavity for molding of the stopper, the harness receiving portion having a burr-cutting portion for holding an outer circumference of the set of wires between the upper die and the lower die such that a gap is provided between the burr-cutting portion and the set of wires, the burr-cutting portion being provided at an end portion of the cavity on each of both sides in the extending direction of the set of wires;

injecting the hard resin in a molten state into the cavity at a low pressure;

sealing the gap between the burr-cutting portion and the set of wires with the hard resin in a molten state; and forming a caulking portion between the set of wires and protruding in the extending direction of the set of wires from a side surface of the stopper from which the set of wires extends out from the stopper.

2. The method according to claim 1, wherein the harness receiving portion comprises a concave portion on the lower die configured to receive the set of wires, and the harness receiving portion comprises a flat surface portion on the upper die to be opposed to the concave portion, and wherein the closing of the upper die and the lower die includes pressing the set of wires received in the concave portion by the flat surface portions in a direction in which the set of wires is held.

3. The method according to claim 1, further comprising setting a temperature of the upper die and lower die lower than a melting temperature of the hard resin in vicinities of the burr-cutting portion.

* * * * *